(12) United States Patent
Nitsche

(10) Patent No.: US 6,374,856 B1
(45) Date of Patent: *Apr. 23, 2002

(54) VALVE DEVICE, ESPECIALLY A COMBINED PROPORTIONAL-DISTRIBUTING VALVE DEVICE

(75) Inventor: Martin Nitsche, Gerstetten (DE)

(73) Assignee: Voith Turbo GmbH & Co., KG, Heidenheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,660

(22) PCT Filed: Mar. 27, 1998

(86) PCT No.: PCT/EP98/01810

§ 371 Date: May 24, 1999

§ 102(e) Date: May 24, 1999

(87) PCT Pub. No.: WO98/44266

PCT Pub. Date: Oct. 8, 1998

(30) Foreign Application Priority Data

Apr. 2, 1997 (DE) .......................... 297 05 635
May 9, 1997 (DE) .......................... 197 19 557

(51) Int. Cl.[7] ............................................. F15B 13/044
(52) U.S. Cl. .................................... 137/625.65; 91/433
(58) Field of Search ........................ 91/433; 137/625.65

(56) References Cited

U.S. PATENT DOCUMENTS

| 3,949,645 A | 4/1976 | Masclet ........................ 91/459 |
| 4,396,037 A | * 8/1983 | Wilcox ................... 137/625.65 |
| 4,478,250 A | * 10/1984 | Lukasczyk et al. ..... 137/625.65 |
| 4,643,225 A | * 2/1987 | Imhof ................ 137/625.65 X |
| 4,941,321 A | 7/1990 | Brunner ....................... 60/468 |
| 5,191,827 A | * 3/1993 | Kervagoret ........ 137/625.65 X |
| 5,251,671 A | * 10/1993 | Hiroki .................... 137/625.65 |
| 5,417,241 A | 5/1995 | Tischer et al. ......... 137/596.17 |
| 5,571,248 A | * 11/1996 | Seetharaman et al. . 137/625.65 |
| 5,577,534 A | * 11/1996 | Ward ................. 137/625.65 X |

FOREIGN PATENT DOCUMENTS

| DE | 38 44 413 A1 | 7/1990 |
| DE | 42 06 210 A1 | 9/1993 |
| DE | 42 44 581 A1 | 12/1993 |
| DE | 196 31 803 A1 | 2/1998 |

OTHER PUBLICATIONS

Mannesmann Rexrodt, RD 29 175/03.93, "Proportional-Druckreduzierventil in 3-Wege-Ausführung", (Undated).
Mannesmann Rexrodt, RD 29 586/09.89, "Servo-Wegeventil in 4-Wege-Ausfumung", (Sep. 1987).
Herion-Werke KG—Fluidtechnik Nr. 7502263,0503.92, "3-Wege-Proportional-Drunkminderventil NG6", (Mar. 1992).

* cited by examiner

Primary Examiner—Gerald A. Michalsky
(74) Attorney, Agent, or Firm—Taylor & Aust, P.C.

(57) ABSTRACT

A valve device includes a valve housing with at least one inlet channel and an outlet channel. A valve piston can be moved axially in the valve housing and has control edges for releasing and blocking the connection between the cross sections of the inlet and outlet channels. A regulating device applies the actuating force to the valve piston. Elements produce a force opposing the actuating force through at least a part (a proportional area) of the overall working range of the valve device, depending on the pressure in the outlet channel.

14 Claims, 5 Drawing Sheets

Performance Curves Prop.-Directional Control Valve

VALVE DEVICE, ESPECIALLY A COMBINED PROPORTIONAL-DISTRIBUTING VALVE DEVICE

BACKGROUND OF THE INVENTION

1. Field of the Invention

The present invention relates to a valve device, especially a proportional valve and/or a directional control valve.

2. Description of the Related Art

Proportional valves, also referred to as directional control valves, are known in numerous design variations and applied in various applications. Directional control valves are valves whose valve pistons, also referred to as control plungers, can be moved to various fixed shift positions allowing different hydraulic connections to be established for the purpose of controlling operating fluids. As a result, a directional change in fluid flow can be achieved. These valves are characterized by their nominal width, their nominal pressure and their possible distribution options. The main module of a directional control valve is the control unit which houses the valve piston inside the valve body or the control housing, thus bringing about the directional change in the fluid flow. There is an actuator attached to at least one of the two end-faces of the valve piston for the purpose of developing the activation force needed to move the valve piston. A frequently applied design variation is the so-called spool valve whereby the valve closing is initiated by the overlap as a result of the relative movements of the individual valve components, especially the valve piston inside the valve body. Depending upon the design and type of movement, these valves are grouped into rotary spool valves, longitudinal spool valves or a combination of both. The appropriate classification of the control units or valve units is determined by the number of connections or number of possible hydraulic lines that are attached, and by the number of possible shift positions. The control edges of the valve piston and the valve body have an especially significant effect on the precision of the shift events. They impact the throttling of the flow area and, hence, the speed of the consumer, usually a machine. Through appropriate shaping of these control edges in concert with the relative motion of the valve piston with respect to the valve body, different flow characteristics can be achieved. Directional control valves offer a certain number of shift positions.

Proportional directional control valves are defined as continuously variable directional control valves, preferably controlled electrically, whose axial motion of the valve piston is directly controlled in a position control mode or in a force control mode, proportional to a set point value, by pressure sealed actuators. The actuators of electrical, continuously variable directional control valves are designed as control magnets (solenoids) which facilitate an axial movement of the valve piston proportional to an electrical set point value. The valve piston is continuously adjustable in any position within the two stop positions provided by the valve body. This has special advantages when controlling and regulating the speed of hydraulic consumers. Such valves, for example, are known from:

1) Sales literature by Mannesmann Rexrodt:
    RD 29 586/09.89
    RD 29 175/03.93; and
2) Sales literature by the Herion-Werke KG—Fluidtechnik Nr. 7502263,0503.92.

These types of proportional valves have the disadvantage that the activation force, which, for example, is generated electro-magnetically, hydraulically, mechanically, or through any other devices must be chosen so that the maximum desired pressure that occurs in the consumer downstream of the valve is capable of being maintained on a long-term basis. The size of the effective area exposed to the pressure is determined by this requirement. This, however, has the consequence that lower pressures must be controlled with appropriately lower activation forces. At desired lower pressures, more pressure variability is to be expected during the control process. An increase in the range of activation force usually causes the size of the actuator to increase. For example, if the actuator is designed in form of an electromagnet, a fundamental increase in the magnetic force causes an increase in the size of the magnetizing coil, which requires more room. Furthermore, the costs of the electrical conductors associated with the larger magnetizing coil are higher and the current consumption also increases. As a general rule, and in view of the applications that use these valves, there are limits to the size of the valve and the actuator. Thus, a precise regulation of the pressure in the consumer cannot always be realized.

SUMMARY OF THE INVENTION

The present invention provides a proportional-directional control valve without that the stated disadvantages. Especially, the pressure fluctuations at very low target pressure settings are minimized. The valve device is furthermore suitable for applications, for example, automatic transmissions, whose requirements dictate the need to control the relatively low pressures in the hydraulic clutch elements as precisely as possible, combined with the need of high (torque) transmission capability of the clutch elements while operating in the converter range.

Within a first pressure range or the proportional range (this range can also correspond to the total operating range, which is on the order of 1–5 bar), the valve device is capable of exerting control in proportion to an electric current at the highest level of precision and at the highest possible activation force, while fully taking advantage of the maximum allowable activation force. Additionally, the valve is capable of operating as a normal directional control valve in a second, elevated pressure range, ranging from 6 to 20 bar. Thus, it is capable of transmitting the full pressure independently from the available pressure level in the consumer. The valve device is able to provide precise and repeatable shift events with minimum side effects from hydraulically-induced binding moments and mechanical friction. While achieving these requirements, the design complexity and cost is kept to a minimum.

In addition to a valve body, which includes at least one supply channel and one return channel, the valve device also includes an axially-moveable valve piston residing inside the valve body. This valve piston includes control edges to open and block the connections of the cross-sectional areas of the supply and return channels, as well as an actuator for providing an activation force onto the valve piston. Devices are provided for the generation of a force, opposing the activation force, at least over a part of the total operating range of the valve device. This force is dependent upon the pressure in the return channel. Inside a pressure range, which determines a first part of the total operating range of the valve device (this first part can also correspond to the total operating range), the possible range in activation force is increased relative to the pressure range at the consumer, promoting a more sensitive modulation of the activation forces and the final pressure at the consumer. Thus, a given pressure range at the consumer or return channel requires a larger range in activation force as compared to a conventionally-designed proportional valve. This is achieved after the valve piston has reached a control position by reaching an equilibrium between the activation force and a pressure force. The pressure force imposes a load on a certain area as a function of the pressure in the consumer, directionally opposing the activation force.

An interior opening inside the valve piston extends all the way to the far end of the valve piston relative to the actuator. A plunger resides inside the interior opening, whereby the plunger and the valve piston are moveable relative to one another. A limit stop provides support for the plunger. A connecting hole is between the interior opening of the valve piston and the outer periphery of the valve piston. The mouth of the connecting hole at the outer periphery of the valve piston is arranged so that the connecting hole is in communication with the return channel while operating in the stated portion of the total operating range, the proportional range.

The present invention makes it possible to achieve the highest possible ratio between activation forces and friction forces. The friction forces are determined primarily by the pressure differences at the valve, the contamination level of the operating fluid, the valve diameter or other design-related features. The activation forces are limited primarily by the size of the actuators. In the case of electromagnetic devices, the size of the magnet is the limiting factor. Even at lower activation force ranges, it is possible to adjust lower pressure levels in the consumer or in the return channel connected to the consumer.

In a preferred embodiment, the valve is designed as a combination of a proportional-directional control valve. In addition to offering the function of distributing the fluid, the valve device further includes a device which limits and compensates the magnitude of the force opposing the activation force. This device is designed in the form of an energy storage unit which is associated with the limit stop for the plunger and limits the force upon the plunger. In the event the pressure force, which is determined by the pressure in the return channel and the plunger area, exceeds the opposing force supporting the plunger, developed by the energy storage unit, the limit stop no longer functions as a solid stop. Instead, the limit stop is forcibly moved by the plunger. This movement is limited by an additional limit stop located between the plunger and the valve piston. Once the plunger has reached this limit stop, the plunger is no longer moveable in the direction of the pressure force, and the valve piston then moves solely in response to the activation force.

The valve device facilitates the control of at least a first lower pressure range at the consumer, which determines a first part of the total operating range of the valve device, at nearly the maximum possible activation forces. In an upper pressure range, which determines a second part of the total operating range of the valve device, the valve functions solely as a directional control valve. This means that for the second part of the total operating range, the pressure present in the return channel, which is directly coupled to the consumer, no longer has any impact whatsoever on the function of the valve device. Thereby, precise control performance can be obtained in the first part of the total operating range of the valve device, which is the lower pressure range, in spite of small command values. The transition of the valve device from the proportional function to the directional control function occurs automatically as a function of the pressure in the consumer. The point of transition can be determined through appropriate geometric and dynamic design considerations of the valve device.

In terms of the design arrangement, the valve device includes at least one valve body with a center bore, containing a valve piston which is moveable in axial direction. The center bore, in combination with associated chambers, form so-called pressure compartments, which, corresponding to the position of the valve piston in the center bore, allow a connection between a supply line and a return line, preferably a return line that is connected to a consumer. In addition, the valve piston includes an interior opening containing a plunger which is moveable in axial direction. The plunger is axially limited by a limit stop, which is supported by an energy storage unit. The plunger, or more precisely, the end-face of the plunger facing away from the limit stop and extending into the interior opening of the valve piston, is exposed to the pressure present in the return line or the connecting line to the consumer via a connecting hole (preferably in the form of a connecting orifice). The purpose of the orifice is to provide a path linking the interior opening to the outer periphery of the valve piston, which is positioned in the proportional range in the area of the return flow. The valve is conceptually designed so that in a first end position, the connection between the supply and the return, the connection to the consumer, is blocked.

The capability of activating the valve piston in the valve body is provided by use of an actuator. A preferred actuator is an electromagnetic actuator. Other possibilities are also possible, such as, for example, an electro-hydraulic actuator. When desiring continuous control, the valve piston is activated by the actuator by applying a force $F_{application}$. This causes a connection to be established between the pressure compartments, which are formed by the chamber connected to the inlet by the center bore, as well as the center bore and a chamber at the outlet. As a result, the operating fluid can flow from the supply to the consumer. At the same time, a pressure level is reached across the connecting orifice between the interior opening and the outer periphery of the valve piston in the area of the return, which is acting upon the end-face of the plunger, which in turn, is supported by the limit stop in the valve body. Thereby, an equilibrium condition is created, i.e., the activation force equals the pressure force, which is the result of the consumer pressure acting on the plunger area. Through provisions of a further energy storage unit between the valve piston and the plunger in the interior opening of the valve piston, the resultant force is added to the pressure force.

The plunger is supported by the limit stop, which is part of the energy storage unit. The force generated by the energy storage unit corresponds to the force of the plunger at maximum desired proportional pressure, so that in the entire proportional range, no changes take place to the force exerted by the energy storage unit, or to the position of the limit stop. The pre-load of the energy storage unit serves as a direct set value for the targeted maximum, desired proportional pressure.

Only when the regulated pressure in the consumer, that is, the return, generates a force on the plunger inside the interior opening greater than the force generated by the energy storage unit associated with the limit stop, does the plunger compress the energy storage unit and come to rest on at least one limit stop shaped as an overhang and integrated into the valve piston. As soon as this condition is reached, the pressure in the consumer can no longer act upon the valve. The position of the valve piston is then determined solely by the external forces of the actuator and the energy storage unit, in the same way as in the case with a directional control valve.

For applications of a valve device, with the two functions, proportional function and directional control function, on automatic transmissions, the shift pressure can be arranged such that all shift events lie within the proportional range, and the upper pressure range solely serves to transmit torque.

In addition to the valve's more sensitive capability to adjust pressure, there are other substantial advantages such as universal application potential, whereby several design requirements can be satisfied by only one valve device. These advantages include a more sensitive modulation of the activation forces and the final pressure at the consumer, especially at low pressure levels, as well as the ability to provide high pressures to the consumer and reliably maintain these pressures.

It is advantageous to design these energy storage units in the form of pressure storage units such as, for example, individual compression springs or spring packs. It is also possible to use elastic membranes.

The valve device can be operated as a pure proportional valve by dispensing with the energy storage unit at the limit stop, or it can be operated as a pure directional control valve by designing the energy storage unit so that the activation force immediately leads to the movement of the valve piston to the end position. This can be accomplished by selecting a very low pre-load in the energy storage unit. A low pre-load of the energy storage unit results in a small proportional range. A large pre-load of the energy storage unit results in a large proportional range. This makes it possible to create a compact base valve unit which can be adapted with little effort, through only minor modifications, to different requirements. The individual components can be designed utilizing the modular concept.

The valve device described by this invention can include any type of actuator. The use of electromagnetic, mechanical, hydraulic, or any other type of actuator is possible.

Electro-magnetic actuators include at least an electromagnet including a coil and an armature.

For valves whose activation force is generated electromagnetically, different displacement limits of the valve piston or the armature can be assigned to the individual functional states "proportional valve" and "directional control valve." This has the advantage of lower current consumption of the magnetizing coil in state "directional control valve," which is especially advantageous since this state occupies the majority of time and, therefore, is most significant in terms of the heating and the resultant durability of the coil, as well as the hardware responsible for controlling the valve. The maximum possible displacement within the proportional range is approximately 80 percent in relation to the total displacement. Minor deviations from this value are possible.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1A:
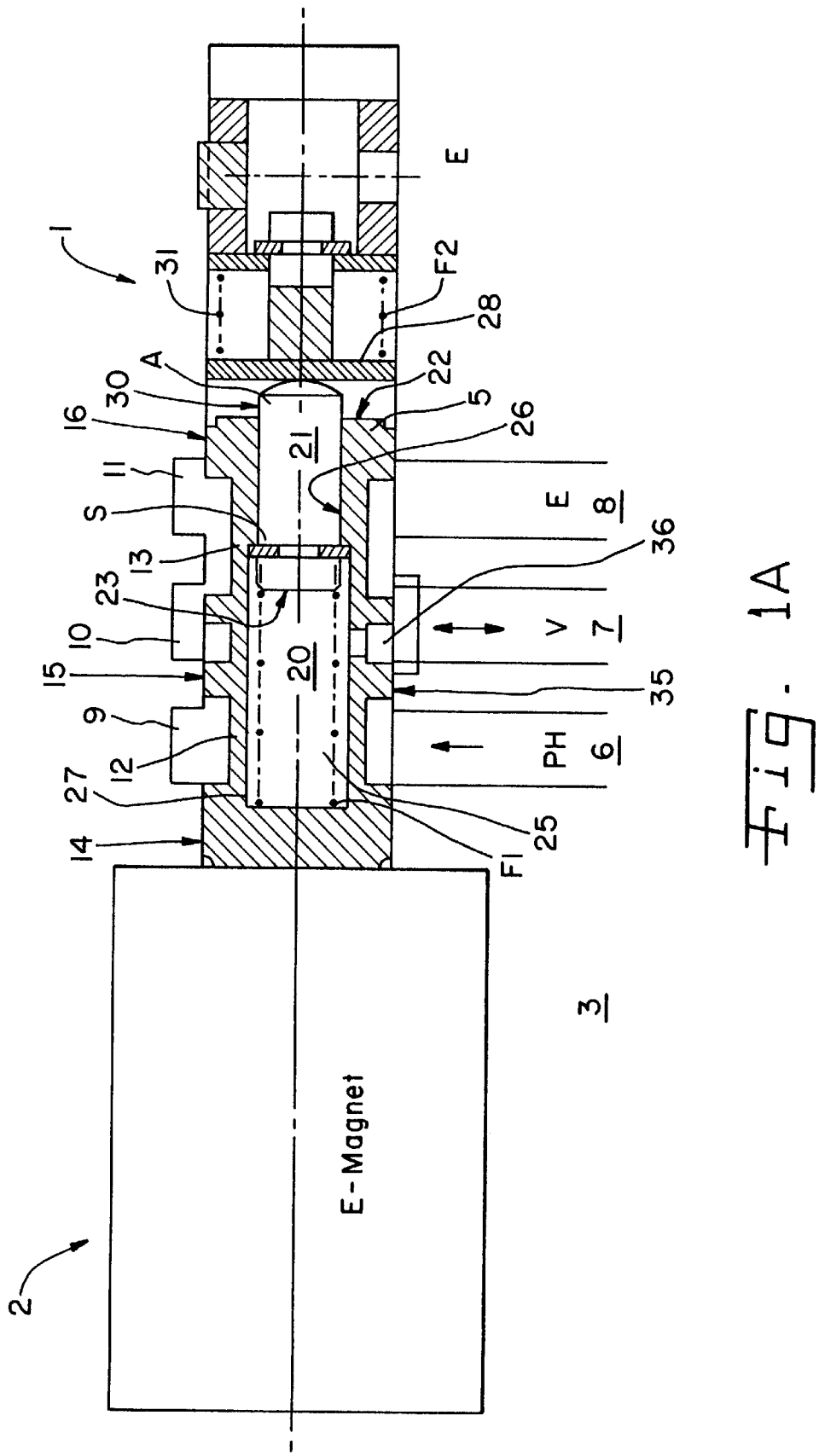
FIG. 1a is a side, sectional view of one embodiment of a valve device of the present invention in one operating state.

Referring now to the drawings and particularly to FIG. 1, there is shown a partial cross section of a proportional-directional control valve 1 in accordance with this invention. In a preferred embodiment, the valve is controlled electromagnetically. For this purpose, an electromagnet 2 is provided. The proportional-directional control valve 1 includes a valve body 3, which contains a center bore within which valve piston 5 resides in an axially moveable manner. Adjoining the center bore are a minimum of two connections in form of connecting channels 6, 7 and 8 extending from the outer periphery of valve piston 5 radially inward to the center bore. Connecting channel 6 serves as the supply channel, connecting channel 7 as the return channel. The connecting channels 6, 7 and 8 lead to the center bore, which has additional chambers 9, 10 and 11 located in the area of the channels. These channels are connected to the center bore and are positioned in circumferential direction, including a diameter that is larger than the center bore. Chambers 9, 10 and 11, which are machined into the valve body 3, form together with the center bore the control edges of valve body 3.

In the embodiment shown, valve piston 5 has different diameters along its axis. As indicated in FIG. 1, there are two areas, designated as 12 and 13, that exhibit smaller diameters. The difference between these larger and smaller diameters creates the control edges 14, 15 and 16 on valve piston 5. The control edges 14, 15 and 16 of valve piston 5 and the control edges of valve body 3 have a special significance in terms of the precision of the control events. They affect the throttling of the flow area and thereby the speed of the machine or the consumer, which is downstream of the proportional-directional control valve device 1. Chambers 9, 10 and 11, which are shaped by the center bore and the outer contour of valve piston 5, form the variable pressure compartments. Different flow characteristics can be achieved through appropriate shaping of the individual control edges.

Valve device 1 has three connections in the embodiment shown. Connecting channel 6 serves to connect the pressure compartment formed by chamber 9 and the center bore with the pressure supply source. Connecting channel 7 serves to connect the pressure compartment formed by chamber 10 and the center bore with the consumer (not shown).

Valve piston 5 includes an interior opening 20 extending axially parallel to its centerline to end-face 22. Within this interior opening 20 resides an axially moveable plunger 21. Plunger 21 can assume different positions; it can be positioned so it is completely inside the interior opening 20, or it can protrude from opening 20, meaning it extends beyond the end-face 22 of valve piston 5. In order to avoid the plunger 21 slipping out of the interior opening 20 of valve piston 5, the plunger 21 is provided with a protruding flange, located near the end-face 23 of plunger 21. End-face 23 faces in the opposite direction relative to end-face 22 of the piston valve 5. This protruding flange can be a separate piece, such as for example, a ring-shaped piece that is plugged, pressed or screwed onto the plunger 21. Also possible is a one-piece plunger with an integrated protruding flange. This flange can be a single unit extending around the entire circumference, or it can be multiple segments located along the circumference in a specified manner.

Furthermore, the interior opening 20 is separated into two areas with different diameters, i.e., a first area with a larger diameter and a second area with a reduced diameter 26. The area with the reduced diameter serves as a receptacle and a guide for plunger 21. The area associated with the larger diameter is used to house an energy storage unit 27 in the form of a compression spring, as shown. Alternatively, energy storage unit 27 could be in the form of one or more elastic membranes (not shown).

Adjacent to the piston valve's end-face 22, which is facing away from the actuator 2 (in this case an electromagnet or, alternatively, a hydraulic actuator (not shown)), resides an axially moveable limit stop 28, onto which the end-face, or at least part of the end-face 30 of the plunger 21 acts upon. Limit stop 28 is supported by an energy storage unit 31 in the form of a compression spring, as shown, or one or more elastic membranes, not shown.

The present invention includes two boundary positions. The first boundary position is shown in FIG. 1a. This embodiment depicts a zero-flow state whereby the consumer, which is connected to connecting channel 7 (return channel), is fully unloaded, and the pressure supply through the connecting channel 6 (supply channel) is blocked. This is the result of control edges 14 through 16 not allowing a connection between the respective pressure compartments, one being formed by chamber 9 and the center bore and the other being connected to the consumer. The return channel, which is the connecting channel 7 to the consumer, is blocked.

Figure 1B:
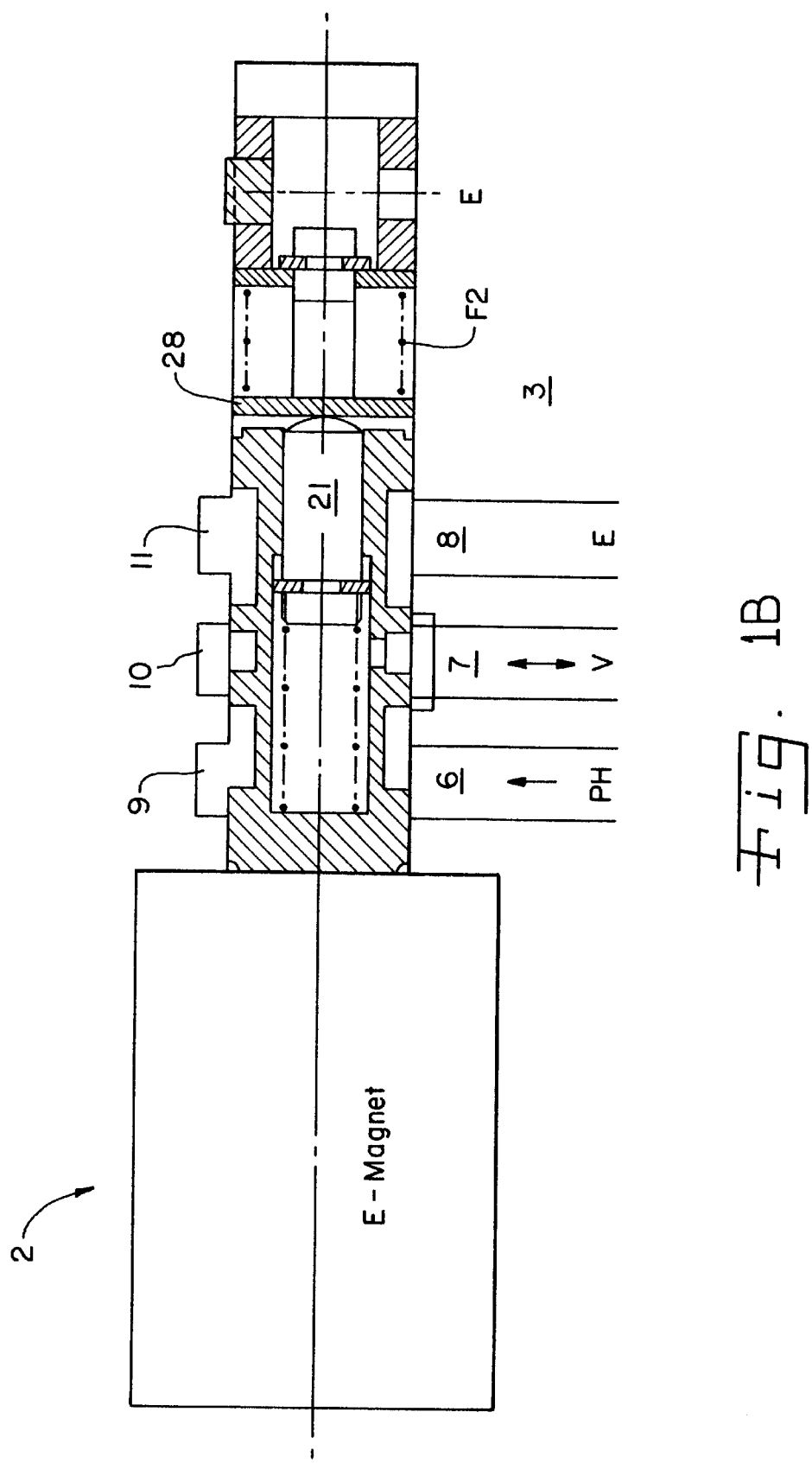
FIG. 1b is a side, sectional view of the valve device of FIG. 1a in another operating state.

FIG 1b illustrates the proportional-directional control valve in a shift position in which the valve functions as a proportional valve. The actuator, including electromagnet 2, incorporates at least one conductor, for example a coil, which is part of the electromagnet and energized by current I. The electrical current value I corresponds to a target set point value for a desired target value at the consumer. The specification of the desired target pressure value at the consumer, also referred to as regulated pressure $W_{pA\ desired}$, can be accomplished by a simple calculation or by using look-up tables or performance curves stored in a memory unit.

The methodology described below is not depicted in the representation and is only one of many possibilities. The pressure adjustment or pressure regulation by valve device 1 occurs, for example, by use of a first control circuit, which is not depicted here. Input values for such a control circuit include a desired regulated pressure $W_{PA\ desired}$ targeted at the return or the return line, as well as a continuously updated actual value of the regulated pressure $p_{A\ actual}$ in the return line. Valve device 1 serves as the final control element for the regulation of the (regulated) pressure. The command value affecting this final control element is, in this case, the value of the magnetic force $F_{magnet}$, which impacts the position of the valve piston 5. The magnetic force $F_{magnet}$ corresponds to the required activation force required to displace valve piston 5 of valve device 1 to open the individual flow areas between the connecting channels 6, 7 and 8. The regulation of the magnetizing force $F_{magnet}$ occurs by use of another control circuit, a sub-circuit of the pressure control circuit. An input value for this second control circuit is a reference variable generated by the pressure regulator for the magnetic force $F_{magnet}$.

In accordance to the magnetic force $F_{magnet}$, the valve piston 5 is displaced in axial direction relative to plunger 21, whereby the pressure compartments, formed by chamber 9 and the center bore, and chamber 10 and the center bore, respectively, establish a connection. The connection between these pressure compartments makes it possible for the supply 6 and the connecting channel 7, (linked to the consumer) to connect. As a result of the connection that is established between the center bore and the pressure compartments formed by chambers 9 and 10, respectively, a certain pressure $p_{actual}$ develops in connecting channel 7. This pressure propagates across the connecting orifice 36, extending radially inward from the periphery of valve piston 5 towards and into the interior compartment 20. This pressure acts upon the area of the plunger formed by end-face 23. In doing so, there is always an equilibrium. The activation force, which is in the form of the magnetic force $F_{magnet}$, always corresponds to the force generated by the energy storage unit plus the pressure force $F_{pressure}$, which is the product of the consumer pressure $p_{actual}$ and the area A of the plunger near the end-face 23. Plunger 21 is supported by the pre-loaded energy storage unit 31, designed as a spring unit in form of a compression spring. The pre-load of the spring unit corresponds to the force of the plunger 21 at maximum proportional pressure so that, during the entire proportional range, no changes take place in the spring unit.

As soon as the adjusted pressure $P_{actual}$ exerts a force on plunger 21, or more precisely, on surface A on the end-face of plunger 21, that is higher than the force of the pre-loaded spring unit 31, plunger 21 compresses spring unit 31. More specifically, the spring pack is compressed until the plunger comes to rest at the shoulder S or the limit stop in the area near the end of valve piston 5. As soon as this state is reached, the pressure in the consumer, or in the connecting line linking the consumer to the connecting line 7, can no longer affect valve device 1. The position of valve piston 5 now solely depends, as is the case with a directional control valve, on the outer forces exerted by the magnet, especially the electromagnet 2, and by the energy storage unit 31, more specifically, the spring unit.

Valve piston 5 continues to move axially towards limit stop 28 as the magnetic force $F_{magnet}$ increases very slightly and opens the way, without restrictions, for the operating fluid, such as oil, to the consumer.

Through the provision of plunger 21, which is exposed to the pressure in the connecting line 7, the activation force on valve piston 5 in the proportional range always has an associated opposing force. This results in a lower activation force required to displace valve piston 5 in axial direction, as compared to a design without the plunger 21, which allows the activation force to directly act upon the valve piston.

Figure 2:
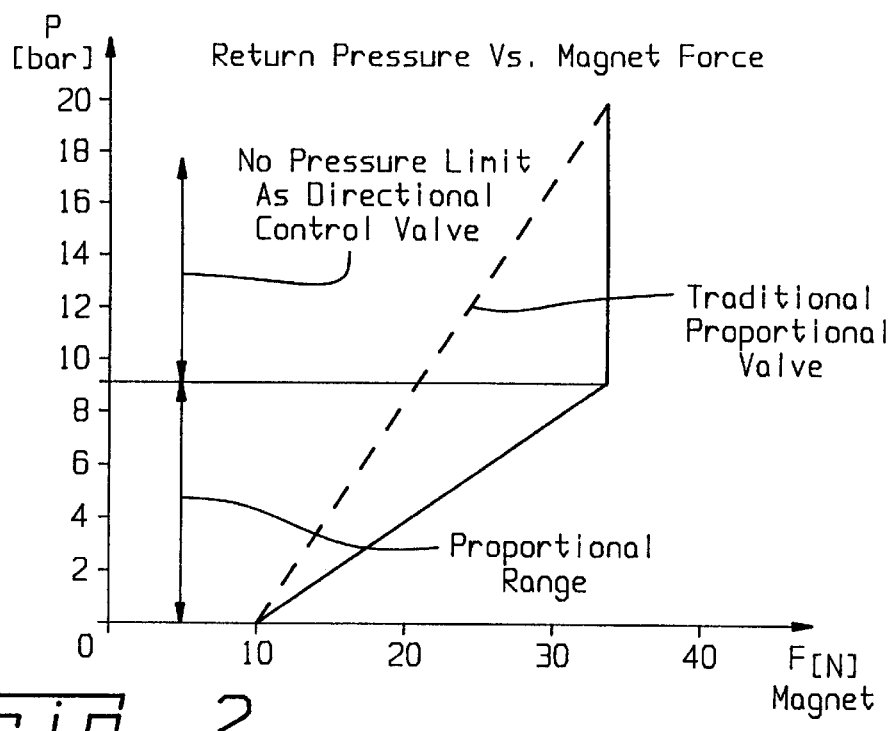
FIG. 2 is a plot of the performance curves of a conventional proportional valve and a combination proportional-directional control valve; specifically, it shows the relationship between the target pressure in the consumer and the magnitude of the magnetic force.

FIG. 2 schematically illustrates the performance characteristics of a proportional-directional control valve, having been designed in accordance with this invention. The diagram reflects the relationship between the return pressure, or the pressure in channel 7 being provided for the consumer, and the magnetic force $F_{magnet}$. For this purpose, the magnetic force $F_{magnet}$ is shown on the X-axis, and the return pressure is shown on the Y-axis. For comparison purposes, the performance curve of a conventional proportional valve is also shown in a dotted line. From this graph, it is evident that the pressure $P_{actual}$ changes linearly with the magnetic force $F_{magnet}$. The present invention, however, allows for a broader proportional range, leading to a reduced slope of the line in this area. Adjacent to the proportional range is a so-called directional control range, inside of which no pressure limitation occurs. The broadening of the proportional range over a larger magnetic force range $F_{magnet}$ allows for a more sensitive regulation of the target pressure at the consumer with respect to the magnetic force $F_{magnet}$.

Figure 3:
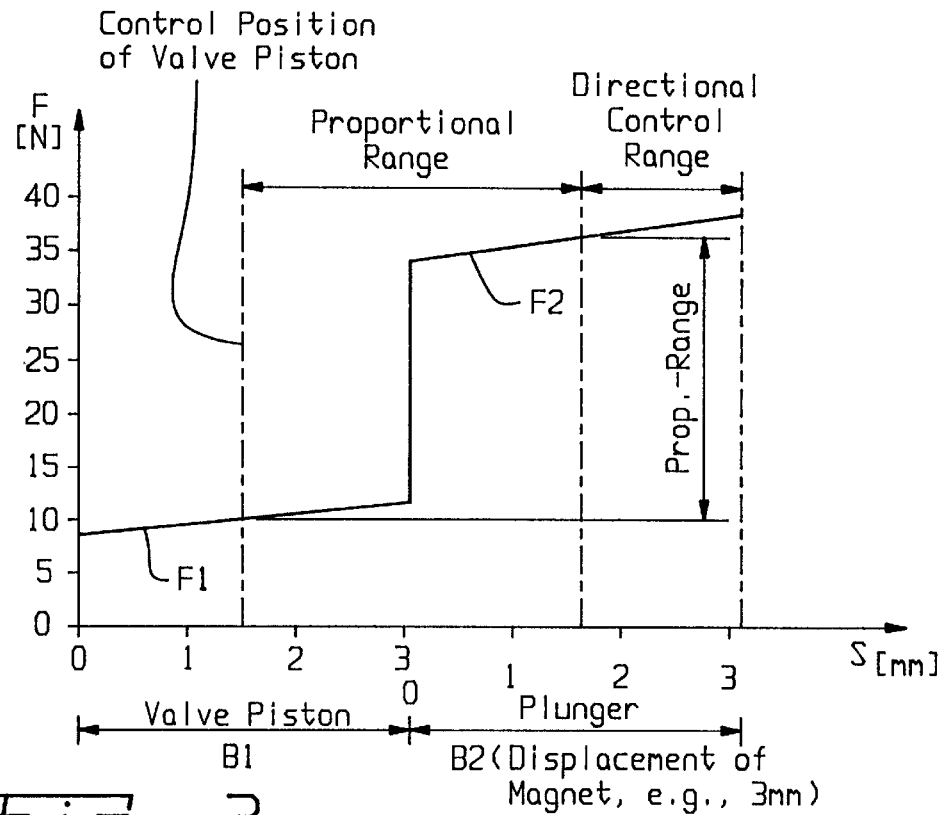
FIG. 3 is a plot of the relationship between the magnetic force and the magnetic displacement of an electromagnetic actuator.

FIG. 3 illustrates the relationship between the magnetic force $F_{magnet}$, which also reflects the activation force for valve device 1, and the displacement of the magnet. From that relationship, it is evident that within a certain range labeled "B1", only valve piston 5 is axially displaced, while within the range of the magnet displacement labeled "B2", only plunger 21 is axially displaced. The proportionality range is characterized by the axial displacement of both valve piston 5 and, in subsequent fashion, plunger 21. The directional control range is characterized only by the axial displacement of plunger 21.

Figure 4:
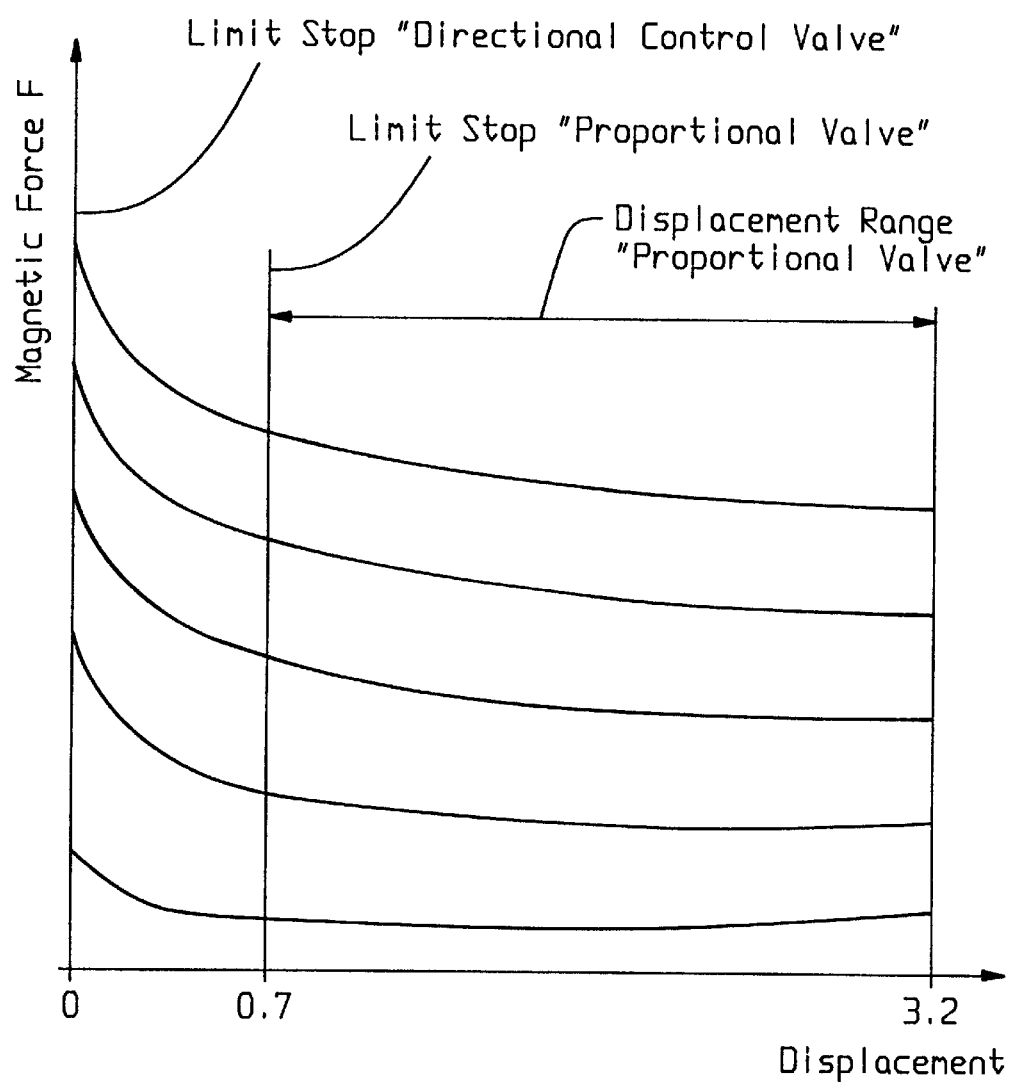
FIG. 4 is a plot of the relationship between the magnetic force and the displacement of either the valve piston or the magnetic coil.

FIG. 4 illustrates the performance curves for the required magnetic force of the activation device in accordance with the present invention, whereby the activation force is created electro-magnetically. The actuator includes at least an electromagnet with a coil and an armature, whereby the armature is moveable under the influence of the magnetic field generated by the coil. As a result of the different utilizations of the performance curves for the magnet force in the individual functional states "proportional valve" and "directional control valve," it is possible to lower the inflow of current into the magnetizing coil while operating in state "directional control valve." The lowering of the inflow of current to the magnetizing coil is especially advantageous, since in the second part of the total operating range, the function "directional control valve" usually occupies the largest portion of time and therefore is most significant in terms of the heating and the resultant durability of the coil as well as the hardware responsible for controlling the valve. This is achieved through different displacement limits so that, as shown in the example provided, a displacement range of 3.2 to 0.7 is utilized in functional state "proportional valve" and in state "directional control valve," the limit stop is used at displacement 0 (zero). The term "displacement" refers to the displacement of the armature or the displacement of the valve piston that is coupled to the armature. By use of a targeted elevation of the magnetic forces in this limit stop position, the current inflow to the magnetic coil can be significantly reduced without creating drawbacks for the operation as a proportional valve.

It is evident from FIG. 4 that in the first part of the total operating range, i.e., the functional state "proportional valve," the magnetic force is substantially constant and is only a function of the current flow to the coil. In the second part, i.e., the functional state "directional control valve," a powerful increase in the magnetic force is noted.

From a design perspective, these limitations are solved by realizing the displacement limit for the function "proportional valve" through the pre-loaded spring pack of the valve. In state "directional control valve", a second limit stop in the magnetizing coil becomes effective. The spring pack of the valve exerts a force on the plunger directionally opposing the force generated by the pressure in the return channel and acting upon the end-face of the plunger.

As can be seen in the diagram, the displacement range of the valve piston in the first part of the total operating range, i.e., the state "proportional valve", uses approximately 80 percent or more of the total operating range. The state "directional control valve" uses approximately 20 percent or less of the total operating range. Small deviations from these values as possible.

In functional state "proportional valve," the control position of the valve piston resides mostly in the center of its displacement range. During control, or, for example, after the charging process, the pressure must be independent of the specified position of the control spool. This means that the pressure finds the value without "overshoot" during transition from charging to control.

Figure 5:
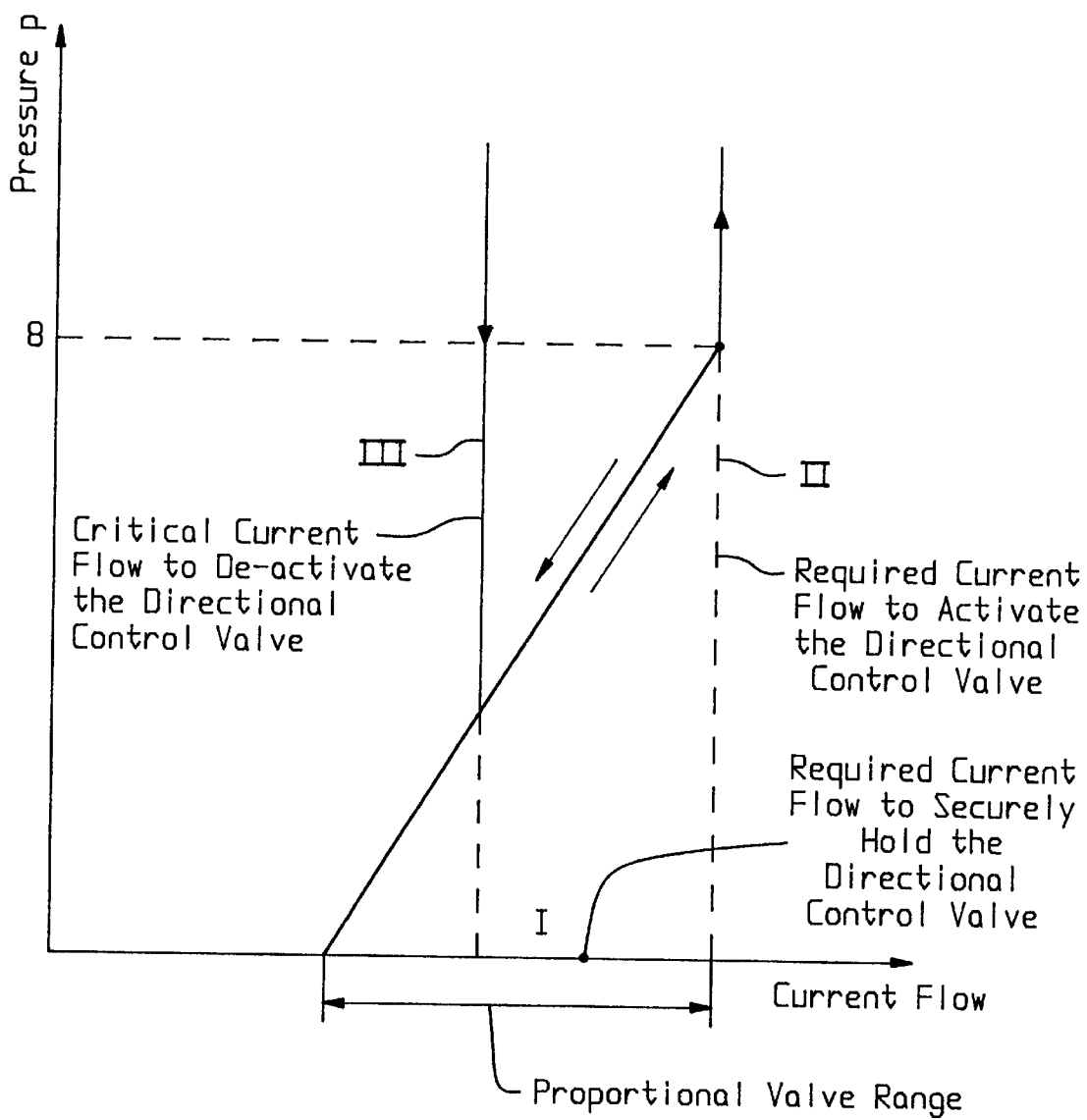
FIG. 5 is a plot of the required current for the functions "proportional valve" and "directional control valve".

FIG. 5 illustrates the characteristic pressure curve vs. the current flow for the functions "proportional valve" and "directional control valve." In this graph, the range of the current flow required for the magnetizing coil to securely hold the directional control valve is labeled as I. The current flow required to activate the directional control valve is labeled as II. The characteristic line for the critical current flow to de-activate the directional control valve is labeled as III.

When applying the valve device to automatic transmissions, the valve device is active during the functional state "proportional valve" in at least two areas:

a) during charging; and b) during the synchronization process.

For the charging process, a certain initial pressure is specified. The charging process itself can occur:

a) regulated; or b) unregulated.

In the first-mentioned case, the valve piston resides during the charging period at the limit stop, for example, limit stop 0.7 as shown in FIG. 4.

In case of a regulated charging process, the valve piston resides during the charging process in the control position.

For the synchronization process, the valve device extends from the limit stop to the control position, or it remains in the same position. It is then possible to regulate any increasing or decreasing pressures.

With respect to the control after synchronization, by use of a momentary, strong current flow, the valve is moved securely into the state "directional control valve." The magnetizing coil moves into position Zero and the pressure effect of the valve is de-activated. The current flow can subsequently be lowered to a "holding current" level, as a result of the increased magnetic forces in the Zero position.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A proportional-directioral control valve apparatus having a total operating range including a first part having a proportional range and a second part, said apparatus comprising:

a valve body including:

at least one supply channel having a cross-sectional area with a connection; and one return channel having a cross-sectional area with a connection, said return channel having a pressure therein;

an axially moveable valve piston disposed in said valve body, said valve piston including:

control edges configured to open and close said connection of said cross-sectional area of said supply channel and said connection of said cross-sectional area of said return channel;

an interior opening;

an outer periphery; and a connecting orifice between said interior opening and said outer periphery, said connecting orifice having a mouth at said outer periphery such that said connecting orifice is in direct communication with said return channel of said valve body;

an actuator configured for exerting an activation force upon said valve piston; and a device configured for generating a force opposing said activation force at least over the proportional range of the total operating range of said valve apparatus, said opposing force being dependent upon said pressure in said return channel, said device including:

a plunger disposed at least partially inside said interior opening of said valve piston, said plunger and said valve piston being moveable relative to each other in an axial direction, said plunger receiving a first force dependent upon said pressure in said return channel of said valve body, said plunger having at least one protruding flange located on the periphery thereof and disposed inside said interior opening, said at least one protruding flange configured to prevent said plunger from slipping out of said interior opening;

a limit stop inside said valve body, said limit stop being configured for limiting said axial movement of said plunger in a direction of said first force received by said plunger; and a first energy storage unit configured for exerting a second force upon said plunger in said valve body, said first energy storage unit being configured for opposing at least one of said activation force and said first force, said energy storage unit having, a pre-load corresponding to said first force at a predetermined proportional pressure and thereby being configured for establishing the proportional range of the total operating range of an axial displacement of said valve piston and said plunger.

2. The apparatus of claim 1, wherein said device includes a second energy storage unit disposed in said interior opening of said valve piston between said valve piston and said plunger.

3. The apparatus of claim 2, wherein said device is configured for exerting a force proportional and in opposition to said pressure in said return channel.

4. The apparatus of claim 3, wherein at least one of said first energy storage unit and said second energy storage unit is one of a compression spring and a plurality of elastic membranes.

5. The apparatus of claim 4, wherein said at least one of said first energy storage unit and said second energy storage unit is a compression spring.

6. The apparatus of claim 5, wherein said plunger has a circular cross section and said interior opening has a circular cross section.

7. The apparatus of claim 6, wherein said actuator is one of a hydraulic actuator and an electromechanical actuator.

8. The apparatus of claim 7, wherein said actuator comprises an electromechanical actuator.

9. The apparatus of claim 6, wherein said actuator comprises an electromagnetic actuator including an electromagnet and a conductor associated with said electromagnet.

10. The apparatus of claim 9, wherein said electromagnetic actuator includes a coil and an armature, said armature being at least directly coupled to said valve piston, said coil being configured for generating a magnetic field for moving said armature, said armature having a first displacement limit for the first part of the total operating range, said first displacement limit becoming effective at approximately 70 to 80 percent displacement, said armature having a second displacement limit for the second part of the total operating range, said second displacement limit becoming effective at approximately 70 to 80 percent displacement to approximately 100 percent displacement.

11. The apparatus of claim 10, wherein said first energy storage unit comprises a compression spring, said first displacement limit comprising said compression spring of said first energy storage unit, said second displacement limit comprising a limit stop associated with said armature.

12. A base valve unit, comprising:

a valve body including:
at least one supply channel having a cross-sectional area with a connection; and
one return channel having a cross-sectional area with a connection, said return channel having a pressure therein;

an axially moveable valve piston disposed in said valve body, said valve piston including:

control edges configured to open and close said connection of said cross-sectional area of said supply channel and said connection of said cross-sectional area of said return channel;
an interior opening;
an outer periphery; and
a connecting orifice between said interior opening and said outer periphery, said connecting orifice having a mouth at said outer periphery such that said connecting orifice is in direct communication with said return channel of said valve body;

an actuator configured for exerting an activation force upon said valve piston;

a plunger disposed at least partially inside interior opening of said valve piston, said plunger including a periphery with at least one protruding flange, said at least one protruding flange being disposed inside interior opening of said valve piston, said at least one protruding flange configured to prevent said plunger from slipping out of said interior opening, said plunger and said valve piston being moveable relative to each other in an axial direction, said plunger receiving said pressure in said return channel of said valve body;

a limit stop disposed in said valve body; and a first energy storage unit associated with said limit stop in said valve body and with said plunger, said first energy storage unit being configured for directly supporting said plunger, said first energy storage unit being configured for exerting a support force in an installed position of said first energy storage unit, said support force being approximately equally to a force of said plunger at a desired proportional pressure.

13. The base unit of claim 12, wherein said interior opening includes an inner wall, said base unit further comprising a second energy storage unit disposed in said interior opening of said valve piston, said second energy storage unit being disposed between said inner wall of said interior opening and said plunger, said second energy storage unit being configured for exerting a second force opposing said activation force.

14. The base unit of claim 13, wherein said first energy storage unit a first compression spring, said second energy storage unit a second compression spring.

* * * * *